(12) United States Patent
Tong et al.

(10) Patent No.: US 8,916,062 B2
(45) Date of Patent: Dec. 23, 2014

(54) HIGH ENERGY MATERIALS FOR A BATTERY AND METHODS FOR MAKING AND USE

(71) Applicant: Wildcat Discovery Technologies, Inc., San Diego, CA (US)

(72) Inventors: Wei Tong, San Diego, CA (US); Steven Kaye, San Diego, CA (US); David Keogh, San Diego, CA (US); Cory O'Neill, San Diego, CA (US)

(73) Assignee: Wildcat Discovery Technologies, Inc., San Diego, CA (US)

(*) Notice: Subject to any disclaimer, the term of this patent is extended or adjusted under 35 U.S.C. 154(b) by 0 days.

(21) Appl. No.: 14/220,042

(22) Filed: Mar. 19, 2014

(65) Prior Publication Data

US 2014/0264198 A1    Sep. 18, 2014

Related U.S. Application Data

(63) Continuation of application No. PCT/US2014/028459, filed on Mar. 14, 2014.

(60) Provisional application No. 61/786,593, filed on Mar. 15, 2013.

(51) Int. Cl.
*H01M 4/88* (2006.01)
*H01M 4/36* (2006.01)

(52) U.S. Cl.
CPC .................................. *H01M 4/364* (2013.01)
USPC ...................... 252/182.1; 252/521.5; 429/188; 429/212; 429/218.1; 429/219; 429/231.95

(58) Field of Classification Search
CPC .............................. H01M 4/5835; H01M 4/04
USPC ............ 252/182.1, 521.5; 429/188, 212, 219, 429/221, 220, 231.95, 218.1
See application file for complete search history.

(56) References Cited

U.S. PATENT DOCUMENTS

| | | | |
|---|---|---|---|
| 5,378,560 | A | 1/1995 | Tomiyama |
| 6,346,349 | B1 | 2/2002 | Briscoe et al. |

(Continued)

FOREIGN PATENT DOCUMENTS

| | | |
|---|---|---|
| CN | 101794877 A | 8/2010 |
| GB | 1383957 A | 2/1974 |

(Continued)

OTHER PUBLICATIONS

Badway et al, High-Capacity Reversible Metal Fluoride Conversion Materials as Rechargeable Positive Electrodes for Li Batteries, Journal of the Electrochemical Society, 150, 10, A1318-A1327, 2003.

(Continued)

*Primary Examiner* — Khanh Tuan Nguyen
(74) *Attorney, Agent, or Firm* — Corridor Law Group, P.C.

(57) ABSTRACT

A composition for forming an electrode. The composition includes a metal fluoride, such as copper fluoride, and a matrix material. The matrix material adds capacity to the electrode. The copper fluoride compound is characterized by a first voltage range in which the copper fluoride compound is electrochemically active and the matrix material characterized by a second voltage range in which the matrix material is electrochemically active and substantially stable. A method for forming the composition is included.

19 Claims, 1 Drawing Sheet

(56) References Cited

U.S. PATENT DOCUMENTS

| | | |
|---|---|---|
| 6,613,213 B1 | 9/2003 | Reilly et al. |
| 6,810,061 B2 | 10/2004 | Hori et al. |
| 6,964,827 B2 | 11/2005 | Barker et al. |
| 7,261,872 B2 | 8/2007 | Greer |
| 7,371,338 B2 | 5/2008 | Amatucci |
| 7,625,671 B2 | 12/2009 | Amatucci |
| 7,947,392 B2 | 5/2011 | Amatucci et al. |
| 8,039,149 B2 | 10/2011 | Amatucci et al. |
| 8,257,866 B2 | 9/2012 | Loveness et al. |
| 2003/0027049 A1 | 2/2003 | Barker et al. |
| 2006/0019163 A1* | 1/2006 | Amatucci et al. ............ 429/220 |
| 2006/0035148 A1 | 2/2006 | Balaya et al. |
| 2007/0243466 A1 | 10/2007 | Amatucci et al. |
| 2007/0285498 A1 | 12/2007 | Shiomi |
| 2008/0199772 A1* | 8/2008 | Amatucci et al. ............ 429/188 |
| 2009/0186276 A1 | 7/2009 | Zhamu et al. |
| 2009/0246636 A1* | 10/2009 | Chiang et al. ............ 429/231.95 |
| 2011/0065001 A1* | 3/2011 | Pereira et al. ................ 429/219 |
| 2011/0229761 A1 | 9/2011 | Cui et al. |
| 2013/0065126 A1 | 3/2013 | Caldwell et al. |

FOREIGN PATENT DOCUMENTS

| | | |
|---|---|---|
| KR | 1020060109305 A | 10/2006 |
| KR | 1020070117826 A | 12/2007 |
| WO | 2004034489 A | 4/2004 |
| WO | 2004051772 A | 6/2004 |
| WO | 2008100002 A1 | 8/2008 |

OTHER PUBLICATIONS

Badway et al, Next Generation Positive Electrode Materials Enabled by Nanocomposites: -Metal Fluorides-, MRS Proceedings. vol. 756. No. 1. Cambridge University Press, 2002.

Badway et al, Structure and Electrochemistry of Copper Fluoride Nanocomposites Utilizing Mixed Conducting Matrices, Chem. Mater. 2007, 19, 4129-4141.

International Search Report for PCT/US2014/028478 Aug. 14, 2014.

International Search Report for PCT/US2014/028506 Jul. 25, 2014.

Liu, Li et al., "Excellent cycle performance of Co-doped $FeF_3$/C nanocomposite cathode material for lithium-ion batteries," J. Mater. Chem., 2012, 22, 17539.

Liu, Xiu-Ming et al., "Effects of $MoO_3$ encapsulating on performances of $CuF_2$ cathode material for application of lithium primary batteries," The Chinese Journal of Nonferrous Metals, Feb. 2010, vol. 20 No. 2, 288-292.

Mansour, A.N. et al., "In situ X-ray absorption spectroscopic investigation of the electrochemical conversion reactions of $CuF_2$—$MoO_3$ nano composite," Journal of Solid State Chemistry 183 (2010) 3029-3038; Oct. 8, 2010.

* cited by examiner

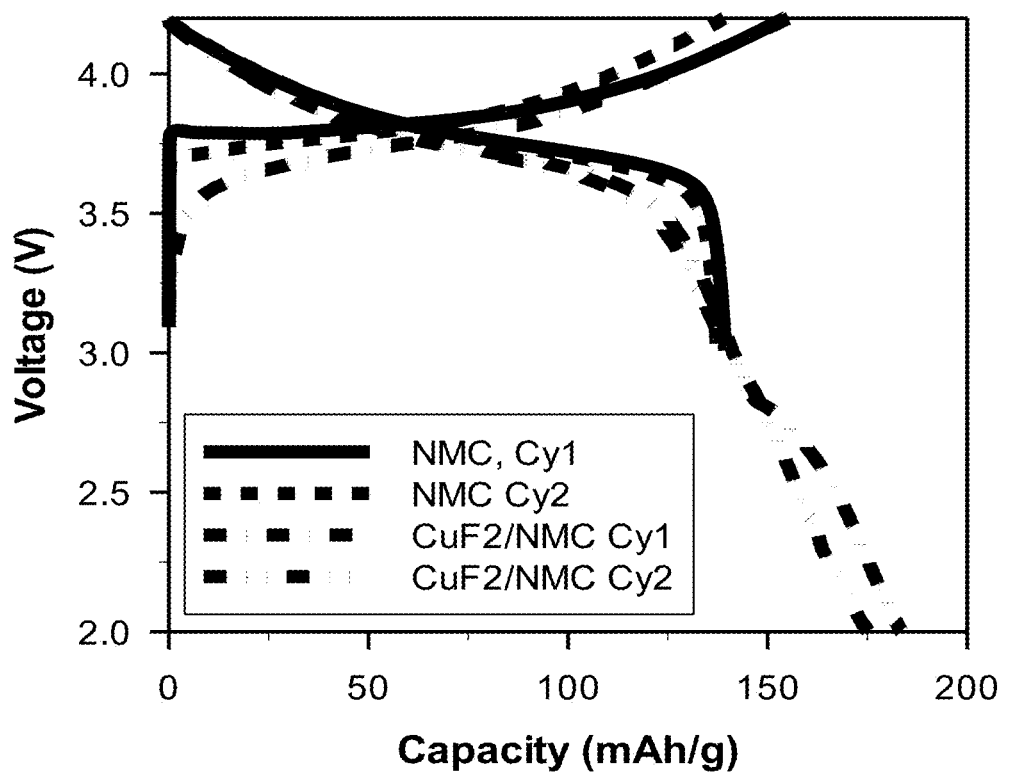

HIGH ENERGY MATERIALS FOR A BATTERY AND METHODS FOR MAKING AND USE

CROSS-REFERENCE TO RELATED APPLICATIONS

This application is a continuation of International Application No. PCT/US2014/028459, having an international filing date of Mar. 14, 2014 entitled "High Energy Materials For A Battery And Methods For Making And Use," which claims priority to U.S. Provisional Application No. 61/786,593 filed Mar. 15, 2013 entitled "High Energy Materials For A Battery And Methods For Making And Use." This application claims priority to and the benefit of each of these applications, and each application is incorporated herein by reference in its entirety.

BACKGROUND OF THE INVENTION

The present invention is in the field of battery technology, and more particularly in the area of materials for making high-energy electrodes for batteries, including metal-fluoride materials.

One type of battery consists of a negative electrode made primarily from lithium and a positive electrode made primarily from a compound containing a metal and fluorine. During discharge, lithium ions and electrons are generated from oxidation of the negative electrode while fluoride ions are produced from reduction of the positive electrode. The generated fluoride ions react with lithium ions near the positive electrode to produce a compound containing lithium and fluorine, which may deposit at the positive electrode surface.

Metal fluoride based batteries are an attractive energy storage technology because of their extremely high theoretical energy densities. For example, certain metal fluoride active materials can have theoretical energy densities greater than about 1600 Wh/kg or greater than about 7500 Wh/L. Further, metal fluorides have a relatively low raw material cost, for example less than about $10/kg. However, a number of technical challenges currently limit their widespread use and realization of their performance potential.

One challenge for certain metal fluoride materials is comparatively poor rate performance. Many metal fluoride active materials have electrochemical potentials greater than about 2.5 V because of their relatively large bandgap produced by the highly ionic bonding between the metal and fluorine, and in particular between a transition metal and fluorine. Unfortunately, one of the drawbacks to wide bandgap materials is the intrinsically low electronic conductivity that results from the wide bandgap. As a result of this low conductivity, discharge rates of less than 0.1 C are required in order to obtain full theoretical capacity. More typically, discharge rates of 0.05 C to 0.02 C are reported in the literature. Such low discharge rates limit the widespread use of metal fluoride active materials.

Another challenge for certain metal fluoride active materials is a significant hysteresis observed between the charge and discharge voltages during cycling. This hysteresis is typically on the order of about 1.0V to about 1.5V. While the origin of this hysteresis is uncertain, current evidence suggests that kinetic limitations imposed by low conductivity play an important role. Further, asymmetry in the reaction paths upon charge and discharge may also play a role. Since the electrochemical potential for many of the metal fluorides is on the order of 3.0V, this hysteresis of about 1.0V to about 1.5V limits the overall energy efficiency to approximately 50%.

Limited cycle life is another challenge for certain metal fluoride active materials. Although rechargeability has been demonstrated for many metal fluoride active materials, their cycle life is typically limited to tens of cycles and is also subject to rapid capacity fade. Three mechanisms are currently believed to limit the cycle life for the metal fluoride active materials: agglomeration of metallic nanoparticles and mechanical stress due to volume expansion. It is believed that metal fluoride active materials can cycle by virtue of the formation during lithiation of a continuous metallic network within a matrix of insulating LiF. As the number of cycles increases, the metal particles tend to accumulate together into larger, discrete particles. The larger agglomerated particles in turn create islands that are electrically disconnected from one another, thus reducing the capacity and ability to cycle the metal fluoride active materials. The second limitation to extended cycle life is the mechanical stress imparted to the binder materials by the metal fluoride particles as a result of the volume expansion that occurs during the conversion reaction. Over time, the binder is pulverized, compromising the integrity of the cathode. Notably, for the metal fluoride $CuF_2$, no demonstrations of rechargeability have been reported.

For $CuF_2$, an additional challenge prevents rechargeability. The potential required to recharge a $CuF_2$ electrode is 3.55V. However, in typical electrolytes for lithium ion batteries, Cu metal oxidizes to $Cu^{2+}$ at approximately 3.5 V vs. $Li/Li^+$. The oxidized copper can migrate to the anode, where it is irreversibly reduced back to Cu metal. As a result, Cu dissolution competes with the recharge of Cu+2LiF to $CuF_2$, preventing cycling of the cell. The Cu metal accumulating on the anode surface can increase the impedance and/or destroy the solid-electrolyte interphase (SEI) on the anode.

The following papers and patents are among the published literature on metal fluorides that employ mixed conductors that are not electrochemically active within the voltage window of the metal fluoride: Badway, F. et al., *Chem. Mater.*, 2007, 19, 4129; Badway, F. et al., *J. Electrochem. Soc.*, 2007, 150, A1318; "Bismuth fluoride based nanocomposites as electrode materials" U.S. Pat. No. 7,947,392; "Metal Fluoride And Phosphate Nanocomposites As Electrode Materials" US 2008/0199772; "Copper fluoride based nanocomposites as electrode materials" US 2006/0019163; and "Bismuth oxyfluoride based nanocomposites as electrode materials" U.S. Pat. No. 8,039,149.

Certain embodiments of the present invention can be used to form electrochemical cells having metal fluoride active material that exhibit improved rate performance, improved energy efficiency, and improved cycle life when compared to prior batteries. Thus, these and other challenges can be addressed by embodiments of the present invention described below.

BRIEF SUMMARY OF THE INVENTION

Certain embodiments of the invention include an electrode for an electrochemical cell. The electrode is formed from a composition including a copper fluoride compound characterized by a first voltage range in which the copper fluoride compound is electrochemically active and a matrix material characterized by a second voltage range in which the matrix material is electrochemically active and substantially stable. The second voltage range overlaps at least 35% of the first voltage range, or at least 40% of the first voltage range, or at least 45% of the first voltage range, or at least 50% of the first voltage range. The matrix material adds capacity to the electrode.

Certain embodiments include the method of making an electrochemical cell containing high-energy cathode materials described herein and methods of use of such electrochemical cells.

BRIEF DESCRIPTION OF SEVERAL VIEWS OF THE DRAWINGS

FIG. 1 illustrates electrochemical characterization of a composite cathode material according to embodiments of the invention compared to a layered oxide cathode material.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically insulating material.

The term "active material" and the like refers to the material in an electrode, particularly in a cathode, that donates, liberates, or otherwise supplies the conductive species during an electrochemical reaction in an electrochemical cell.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the chemical elements in group 17 of the periodic table, including fluorine (F), chlorine (Cl), bromine (Br), iodine (I), and astatine (At).

The term "chalcogen" refers to any of chemical elements in group 16 of the periodic table, including oxygen (O), sulfur (S), selenium (Se), tellurium (Te), and polonium (Po).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "rare earth element" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The terms "NMC" refers generally to cathode materials containing $LiNi_xMn_yCo_zO_w$ and includes, but is not limited to, cathode materials containing $LiNi_{0.33}Mn_{0.33}Co_{0.33}O_2$.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

In certain embodiments, metal fluoride ($MeF_x$) active materials are combined with a conductive matrix material that is also electrochemically active within the appropriate voltage window for the metal fluoride. Such a combination of materials yields a hybrid cathode material with improved properties as compared to known metal fluorides and known matrix materials. For the metal fluoride ($MeF_x$), Me can be any metal and more preferably any transition metal. Preferably, the metal in the metal fluoride is copper and the metal fluoride can be represented, for example, by the formula $CuF_2$. However, the disclosure is not limited to $CuF_2$ and is applicable to other metal fluorides as well.

Generally, a conductive matrix is required to form an electrode with metal fluoride active materials. Conductive matrices enable the use of metal fluorides at practical charge/discharge rates. Without a conductive matrix, the extremely low conductivity for metal fluorides in fully charged and discharged states would make their use impractical. In a specific example, in the fully charged state $CuF_2$ is the predominant phase in a cathode formed from $CuF_2$, while in the fully discharged state LiF (plus metallic Cu) is dominant. Both of these materials have low electronic and ionic conductivity, making it necessary to include another conductive material. A conductive matrix material should therefore have high electronic and ionic conductivity (that is, it should be a mixed conductor) to improve the overall conductivity of the cathode.

In the prior art, typical conductive matrix materials for use with metal fluoride active materials include various conductive oxides, such as $MoO_3$, $MoO_2$, NiO, CuO, $VO_2$, $V_2O_5$, as well as carbon black, activated carbon, and graphite materials. One important limitation for these materials is the voltage range at which the materials are electrochemically active, or voltage window. For most conductive oxides, the highest voltage at which they exhibit significant capacity is less than about 2.5 V. Thus, 2.5 V is generally the upper limit of the voltage window for known conductive oxides.

In contrast, the voltage window for known metal fluorides is much higher, typically from about 1.5 V to about 4.5 V. Thus, there is a mismatch between the voltage windows of metal fluoride active materials and conventional conductive oxide matrix materials. That is, typical conductive matrices are electrochemically inactive within much of the voltage window of metal fluorides and therefore reduce the overall energy density of the electrode.

Further, conventional conductive oxide matrix materials contribute very little reversible capacity to the electrode in situations where such conductive oxide matrix materials are electrochemically active and substantially stable in combination with metal fluoride active materials. In other words, even when the electrochemical cell is operated in a narrow voltage window where the metal fluoride active material and the conductive oxide matrix material are both electrochemically active, for example between about 1.5 V and about 2.5 V, the conductive oxide matrix material does not contribute much reversible capacity to the composite electrode.

According to certain embodiments disclosed herein, composite electrodes are formed from a novel combination of metal fluoride active materials and conductive matrix materials in which the conductive matrix materials exhibit high electronic and ionic conductivity. Further, in certain embodiments the matrix materials are matched with the metal fluoride active materials such that there is significant overlap between the voltage window of the matrix material and the voltage window of the metal fluoride active material.

Preferably, the voltage window of the conductive matrix material overlaps at least 33% of the voltage window of the metal fluoride active material. More preferably, the voltage window of the conductive matrix material overlaps at least 35% of the voltage window of the metal fluoride active material. More preferably, the voltage window of the conductive matrix material overlaps at least 37% of the voltage window of the metal fluoride active material. More preferably, the voltage window of the conductive matrix material overlaps at least 40% of the voltage window of the metal fluoride active material. More preferably, the voltage window of the conductive matrix material overlaps at least 42% of the voltage window of the metal fluoride active material. More preferably, the voltage window of the conductive matrix material overlaps at least 45% of the voltage window of the metal fluoride active material. More preferably, the voltage window of the conductive matrix material overlaps at least 47% of the voltage window of the metal fluoride active material. More preferably, the voltage window of the conductive matrix material overlaps at least 50% of the voltage window of the metal fluoride active material. More preferably, the voltage window of the conductive matrix material overlaps at least 52% of the voltage window of the metal fluoride active material. More preferably, the voltage window of the conductive matrix material overlaps at least 55% of the voltage window of the metal fluoride active material. More preferably, the voltage window of the conductive matrix material overlaps at least 57% of the voltage window of the metal fluoride active material. More preferably, the voltage window of the conductive matrix material overlaps at least 60% of the voltage window of the metal fluoride active material. More preferably, the voltage window of the conductive matrix material overlaps at least 62% of the voltage window of the metal fluoride active material. More preferably, the voltage window of the conductive matrix material overlaps at least 65% of the voltage window of the metal fluoride active material. More preferably, the voltage window of the conductive matrix material overlaps at least 67% of the voltage window of the metal fluoride active material. More preferably, the voltage window of the conductive matrix material overlaps at least 70% of the voltage window of the metal fluoride active material. More preferably, the voltage window of the conductive matrix material overlaps at least 72% of the voltage window of the metal fluoride active material. More preferably, the voltage window of the conductive matrix material overlaps at least 75% of the voltage window of the metal fluoride active material. More preferably, the voltage window of the conductive matrix material overlaps at least 77% of the voltage window of the metal fluoride active material. More preferably, the voltage window of the conductive matrix material overlaps at least 80% of the voltage window of the metal fluoride active material. More preferably, the voltage window of the conductive matrix material overlaps at least 82% of the voltage window of the metal fluoride active material. More preferably, the voltage window of the conductive matrix material overlaps at least 85% of the voltage window of the metal fluoride active material. More preferably, the voltage window of the conductive matrix material overlaps at least 87% of the voltage window of the metal fluoride active material. More preferably, the voltage window of the conductive matrix material overlaps at least 90% of the voltage window of the metal fluoride active material. More preferably, the voltage window of the conductive matrix material overlaps at least 92% of the voltage window of the metal fluoride active material. More preferably, the voltage window of the conductive matrix material overlaps at least 95% of the voltage window of the metal fluoride active material. More preferably, the voltage window of the conductive matrix material overlaps at least 97% of the voltage window of the metal fluoride active material. More preferably, the voltage window of the conductive matrix material overlaps 100% of the voltage window of the metal fluoride active material.

According to certain embodiments disclosed herein, the conductive matrix materials are matched with the metal fluoride active materials such that there is overlap between the voltage window of the conductive matrix material and the voltage window of the metal fluoride active material in the higher voltage ranges of each window. That is, the conductive matrix material is electrochemically active and substantially stable at higher voltages than conventional conductive metal oxide materials.

Preferably, the conductive matrix material is electrochemically active and substantially stable above at least 2.5 V. More preferably, the conductive matrix material is electrochemically active and substantially stable above at least 2.6 V. More preferably, the conductive matrix material is electrochemically active and substantially stable above at least 2.7 V. More preferably, the conductive matrix material is electrochemically active and substantially stable above at least 2.8 V. More preferably, the conductive matrix material is electrochemically active and substantially stable above at least 2.9 V. More preferably, the conductive matrix material is electrochemically active and substantially stable above at least 3.0 V. More preferably, the conductive matrix material is electrochemically active and substantially stable above at least 3.1 V. More preferably, the conductive matrix material is electrochemically active and substantially stable above at least 3.2 V. More preferably, the conductive matrix material is electrochemically active and substantially stable above at least 3.3 V. More preferably, the conductive matrix material is electrochemically active and substantially stable above at least 3.4 V. More preferably, the conductive matrix material is electrochemically active and substantially stable above at least 3.5 V. More preferably, the conductive matrix material is electrochemically active and substantially stable above at least 3.6 V. More preferably, the conductive matrix material is electrochemically active and substantially stable above at least 3.7 V. More preferably, the conductive matrix material is electrochemically active and substantially stable above at least 3.8 V. More preferably, the conductive matrix material is electrochemically active and substantially stable above at least 3.9 V. More preferably, the conductive matrix material is electrochemically active and substantially stable above at least 4.0 V.

According to certain embodiments disclosed herein, the conductive matrix materials add capacity in the resulting composite electrode. That is, the addition of the conductive matrix material increases the overall capacity of the composite electrode relative to the use of an electrochemically inert matrix.

Preferably, the conductive matrix material adds at least 30 mAh/g to the composite electrode where the units are mAh/g of matrix.

Conductive matrix materials that satisfy certain of the criteria disclosed herein include $LiFePO_4$ and $LiNi_xMn_yCo_zO_2$ ("NMC"). Conductive matrix materials can be a single material or combinations of one or more conductive matrix materials. Generally, layered oxide materials are useful in embodiments herein.

For example, $LiFePO_4$ has a specific capacity of about 150 mAh/g and a voltage window from about 2.8 V to about 3.6 V. As another example, $LiNi_xMn_yCo_zO_2$, a specific capacity of 150-250 mAh/g and a voltage window from about 2.5 V to about 4.2 V. According to certain embodiments, these materials are matched with a $CuF_2$ active material. As exemplified herein, certain combinations of conductive matrix materials and metal fluoride active materials provide at least a 30% improvement in discharge capacity on first cycle. Certain combinations of conductive matrix materials and metal fluoride active materials provide improvements in reversible capacity.

FIG. 1 demonstrates increased capacity for a 1:9 $CuF_2$/NMC composite cathode. The voltage traces for the control material demonstrate that the control material has a capacity around 150 mAh/g on the first and second cycles. The composite cathode has a capacity of at least 175 mAh/g on the first and second cycles. The conductive matrix material has increased the capacity of the NMC cathode material by at least 16%.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Fabrication of Composite Electrodes Using Electrochemically Active Materials

Materials and Synthetic Methods. Hybrid cathodes composed of a metal fluoride and an electrochemically active conductive matrix were synthesized using a process that includes both milling and annealing. Typically, metal fluoride precursors (e.g., $CuF_2$, $FeF_3$) were milled together with the electrochemically active cathode material (e.g., LFP, NMC), followed by an annealing step. The temperature of the annealing step depends upon the choice of metal fluoride, but is typically performed at 200 degrees C.

Electrode Formulation.

Cathodes were prepared using a formulation composition of 85 wt % active material, 7.5 wt % binder, and 7.5 wt % conductive additive according to the following formulation method: 198 mg PVDF (Sigma Aldrich) was dissolved in 15 mL NMP (Sigma Aldrich) overnight. 198 mg of conductive additive was added to the solution and allowed to stir for several hours. 150 mg of the hybrid cathode material was then added to 1 mL of this solution and stirred overnight. Films were cast by dropping about 50 mL of slurry onto stainless steel current collectors and drying at 150 degrees C. for about 1 hour. Dried films were allowed to cool, and were then pressed at 1 ton/cm$^2$. Electrodes were further dried at 150 degrees C. under vacuum for 12 hours before being brought into a glove box for battery assembly.

Example 2

Electrochemical Characterization of Electrochemical Cells Containing Composite Electrodes All batteries were assembled in a high purity argon filled glove box (M-Braun, $O_2$ and humidity contents <0.1 ppm), unless otherwise specified. Cells were made using lithium as an anode, Celgard 2400 separator, and 90 mL of 1M $LiPF_6$ in 1:2 EC: EMC electrolyte. Electrodes and cells were electrochemically characterized at 25 degrees C. with a constant current C/50 charge and discharge rate between 4.2 V and 2.0 V. No constant voltage step was included.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A composition for forming a cathode for use in a battery, comprising:
   a copper fluoride compound characterized by a first voltage range in which the copper fluoride compound is electrochemically active; and
   a matrix material comprising a lithium, nickel, manganese, cobalt and oxygen containing compound or an $LiFePO_4$ compound;
   wherein the matrix material is characterized by a second voltage range in which the matrix material is electrochemically active; and wherein the second voltage range overlaps at least 35% of the first voltage range.

2. The composition of claim 1 wherein the second voltage range overlaps at least 40% of the first voltage range.

3. The composition of claim 1 wherein the second voltage range overlaps at least 45% of the first voltage range.

4. The composition of claim 1 wherein the second voltage range overlaps at least 50% of the first voltage range.

5. The composition of claim 1 wherein the matrix material comprises an NMC material.

6. The composition of claim 1 wherein the matrix material adds specific capacity to the composition as compared to a composition without the matrix material.

7. A cathode formed using the compositions of claim 1.

8. The cathode of claim 7 wherein the cathode is a composite cathode.

9. The composition of claim 1 further comprising a phase comprising elements of the copper fluoride material and elements of the matrix material wherein the phase is formed by an annealing step.

10. The composition of claim 1 wherein the matrix material comprises a lithium, nickel, manganese, cobalt and oxygen containing compound.

11. The composition of claim 1 wherein the matrix material comprises $LiNi_{0.33}Mn_{0.33}Co_{0.33}O_2$.

12. The composition of claim 1 wherein the matrix material comprises a lithium, nickel, manganese, cobalt and oxygen containing compound.

13. A method of making a composition for use in a cathode for a battery, comprising:
   mixing a copper fluoride compound characterized by a first voltage range in which the copper fluoride compound is electrochemically active with a matrix material comprising a lithium, nickel, manganese, cobalt and oxygen containing compound and characterized by a second voltage range in which the matrix material is electrochemically active, wherein the second voltage range overlaps at least 35% of the first voltage range; and
   annealing the mixture.

14. The method of claim 13 wherein the second voltage range overlaps at least 40% of the first voltage range.

15. The method of claim 13 wherein the second voltage range overlaps at least 45% of the first voltage range.

16. The method of claim 13 wherein the second voltage range overlaps at least 50% of the first voltage range.

17. The method of claim 13 wherein the matrix material comprises an NMC material.

18. The method of claim 13 wherein the annealing step forms a phase comprising elements of the copper fluoride material and elements of the matrix material.

19. The method of claim 13 wherein the matrix material comprises $LiNi_{0.33}Mn_{0.33}Co_{0.33}O_2$.

* * * * *